United States Patent
Bland, III et al.

(10) Patent No.: US 10,427,711 B2
(45) Date of Patent: Oct. 1, 2019

(54) METHOD OF SELF-DIAGNOSIS FOR POWER STEERING ASSEMBLY

(71) Applicant: GM GLOBAL TECHNOLOGY OPERATIONS LLC, Detroit, MI (US)

(72) Inventors: Coburn C. Bland, III, Lake Orion, MI (US); Bo Yu, Ann Arbor, MI (US); Adam J. Kloess, Novi, MI (US); Scott P. Sherman, Fenton, MI (US); Ibrahim A. Badiru, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 160 days.

(21) Appl. No.: 15/653,022

(22) Filed: Jul. 18, 2017

(65) Prior Publication Data
US 2019/0023314 A1 Jan. 24, 2019

(51) Int. Cl.
*B62D 5/04* (2006.01)
*B62D 6/00* (2006.01)

(52) U.S. Cl.
CPC .......... *B62D 5/0481* (2013.01); *B62D 5/0457* (2013.01); *B62D 5/0463* (2013.01); *B62D 6/00* (2013.01)

(58) Field of Classification Search
CPC ....... B62D 5/0463; B62D 5/0481; B62D 6/00
USPC .......................................................... 701/41
See application file for complete search history.

(56) References Cited

U.S. PATENT DOCUMENTS

| | | | |
|---|---|---|---|
| 2007/0205040 A1* | 9/2007 | Miyasaka | B62D 5/001 180/444 |
| 2007/0215405 A1* | 9/2007 | Tsutsumi | B62D 5/001 180/402 |
| 2011/0098888 A1* | 4/2011 | Kariatsumari | B62D 5/046 701/41 |
| 2015/0151784 A1* | 6/2015 | Moretti | B62D 15/024 701/41 |
| 2015/0225015 A1* | 8/2015 | Takeda | B62D 6/008 701/41 |
| 2015/0232124 A1* | 8/2015 | Takeda | B62D 15/025 701/42 |
| 2015/0274203 A1* | 10/2015 | Takeda | B62D 6/008 701/42 |
| 2015/0336606 A1* | 11/2015 | Shibuya | B60W 10/02 180/444 |
| 2015/0353128 A1* | 12/2015 | Shibuya | B60W 10/02 701/41 |

(Continued)

*Primary Examiner* — Atul Trivedi
(74) *Attorney, Agent, or Firm* — Quinn IP Law

(57) ABSTRACT

A power steering assembly includes a steering unit and a motor. A controller includes a processor and tangible, non-transitory memory on which is recorded instructions for executing a method of self-diagnosis for the assembly. If a plurality of enabling conditions is met, the steering unit is caused to rotate through a plurality of angles from an original position, via a command to the motor. The steering unit is caused to rotate first in a forward direction up to a predefined maximum angle, second in a reverse direction up to a negative of the predefined maximum angle and third in the forward direction back to the original position. The controller is configured to obtain motor torque data characterizing torque of the motor at the plurality of angles. The assembly is controlled based at least partially on the motor torque data and predetermined baseline data.

20 Claims, 3 Drawing Sheets

(56) References Cited

U.S. PATENT DOCUMENTS

| | | | |
|---|---|---|---|
| 2016/0121905 A1* | 5/2016 | Gillingham | B62D 5/0406 |
| | | | 701/37 |
| 2016/0280267 A1* | 9/2016 | Lavoie | B62D 15/0285 |
| 2017/0113714 A1* | 4/2017 | Guerra | B62D 5/0463 |
| 2017/0320518 A1* | 11/2017 | Lavoie | B62D 13/06 |
| 2018/0001928 A1* | 1/2018 | Lavoie | B62D 13/06 |
| 2018/0201156 A1* | 7/2018 | Mangette | B60L 15/20 |
| 2019/0002014 A1* | 1/2019 | Shah | B62D 5/0457 |

* cited by examiner

METHOD OF SELF-DIAGNOSIS FOR POWER STEERING ASSEMBLY

INTRODUCTION

The present disclosure relates generally to a power steering assembly and a method of self-diagnosis for the power steering assembly. An operator may control the direction of a transportation device, such as a vehicle, with the aid of a steering unit, such as a steering wheel. The steering unit may be mechanically or electronically connected to the road wheels. Many devices include a secondary system to generate a force that is transmitted through a steering gear assembly. The additional force is employed to control the steering unit and may be generated by an electric motor.

SUMMARY

A power steering assembly includes a steering unit and a motor operatively connected to the steering unit. A controller is operatively connected to the motor and includes a processor and tangible, non-transitory memory on which is recorded instructions for executing a method of self-diagnosis for the assembly. The steering unit is configured to be rotatable by the motor based on a command by the controller to the motor. Execution of the instructions by the processor causes the controller to determine if one or more enabling conditions are met.

If the enabling conditions are met, the steering unit is caused to rotate through a plurality of angles from an original position, via the command to the motor. The steering unit is caused to rotate first in a forward direction up to a predefined maximum angle, second in a reverse direction up to a negative of the predefined maximum angle and third in the forward direction back to the original position. The controller is configured to obtain a motor torque data (characterizing the motor torque) of the motor at the plurality of angles. The assembly is controlled based at least partially on the motor torque data and predetermined baseline data. In one example, the predefined maximum angle is about 2 degrees. In another example, the predefined maximum angle is above 360 degrees.

The method includes comparing the motor torque data to the predetermined baseline data, including determining if an area factor exceeds a first predefined threshold. A first of a plurality of flags is set as true if the area factor exceeds the first predefined threshold. The area factor may be based at least partially on respective areas $[A_1, A_2, A_3, A_4]$ and $[BA_1, BA_2, BA_3, BA_4]$. Here, the respective areas $[A_1, A_2, A_3, A_4]$ are between the predetermined baseline data and the motor torque data, in a first, second, third and fourth quadrant, respectively. The respective areas $[BA_1, BA_2, BA_3, BA_4]$ are between the predetermined baseline data, a vertical axis and a horizontal axis, in a first, second, third and fourth quadrant, respectively.

The controller may be configured to determine if a width factor exceeds a second predefined threshold. A second of a plurality of flags is set as true if the width factor exceeds the second predefined threshold. The width factor (WF) may be based at least partially on a difference between a baseline width (BW) of the baseline data at an angle ($\theta$) and a width (W) of the motor torque data at the angle ($\theta$).

The method includes comparing the motor torque data to the predetermined baseline data, including determining if a slope factor exceeds a third predefined threshold. A third of a plurality of flags is set as true if the slope factor exceeds the third predefined threshold. The slope factor (SF) may be based at least partially on a difference between respective slopes (S) of a first portion ($R_i$) of the motor torque data and a corresponding second portion ($BR_i$) of the baseline data. The first portion ($R_i$) and the corresponding second portion ($BR_i$) extend over an identical range of angles.

The controller may be configured to determine if an asymmetry factor exceeds a fourth predefined threshold. A fourth of a plurality of flags is set as true if the asymmetry factor exceeds the fourth predefined threshold. The asymmetry factor (ASF) may be based at least partially on a difference between the torque (T) of the motor torque data and the torque ($T_F$) of a flipped motor torque data, each at the angle ($\theta$). The flipped motor torque data represents the motor torque data after a rotation of 180 degrees about the origin or mirrored about at least one of a vertical axis and a horizontal axis.

Controlling operation of the assembly may include, generating a diagnostic report, via the controller, if at least one of a plurality of flags is true. The controller may also be configured to initiate an alternative mode of operation.

The above features and advantages and other features and advantages of the present disclosure are readily apparent from the following detailed description of the best modes for carrying out the disclosure when taken in connection with the accompanying drawings.

DETAILED DESCRIPTION

Figure 1:
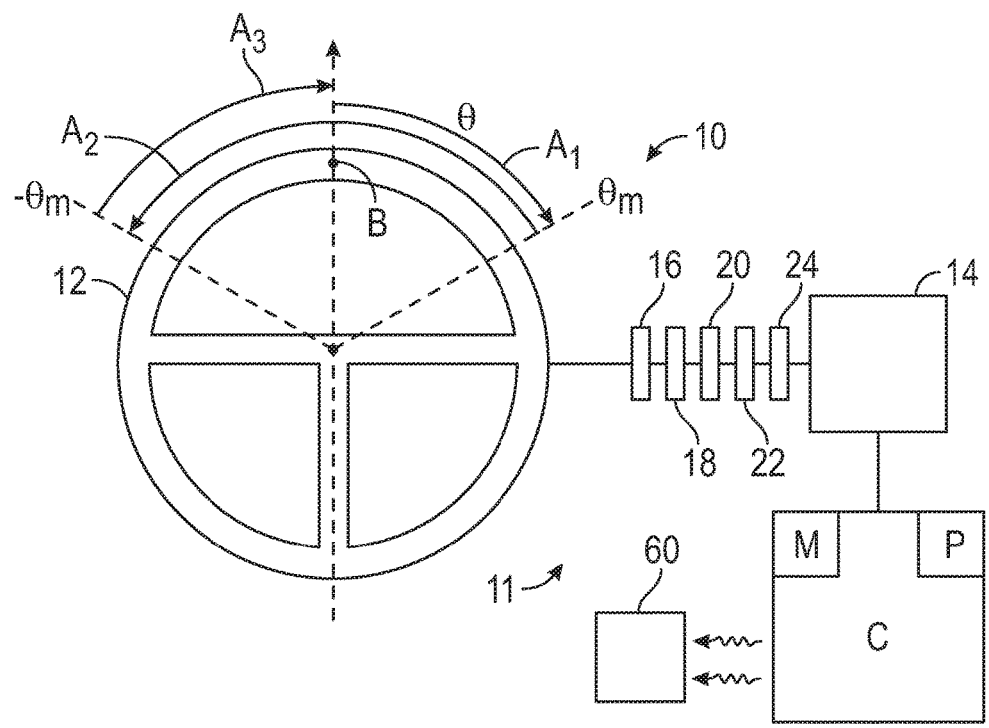
FIG. 1 is a schematic illustration of a power steering assembly having a controller.

Referring to the drawings, wherein like reference numbers refer to like components, FIG. 1 schematically illustrates a power steering assembly 10. The assembly 10 may be part of a device 11. The device 11 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane and train. The device 11 may take many different forms and include multiple and/or alternate components and facilities. Referring to FIG. 1, the assembly 10 includes a steering unit 12 and a motor 14 operatively connected to the steering unit 12. The steering unit 12 is configured to steer the device 11. The steering unit 12 may be a steering wheel or some other type of steering system. A controller C is operatively connected to or in electronic communication with the steering unit 12 and motor 14. The steering unit 12 is configured to be rotatable by the motor 14 based on a command by the controller C to the motor 14.

Figure 2:
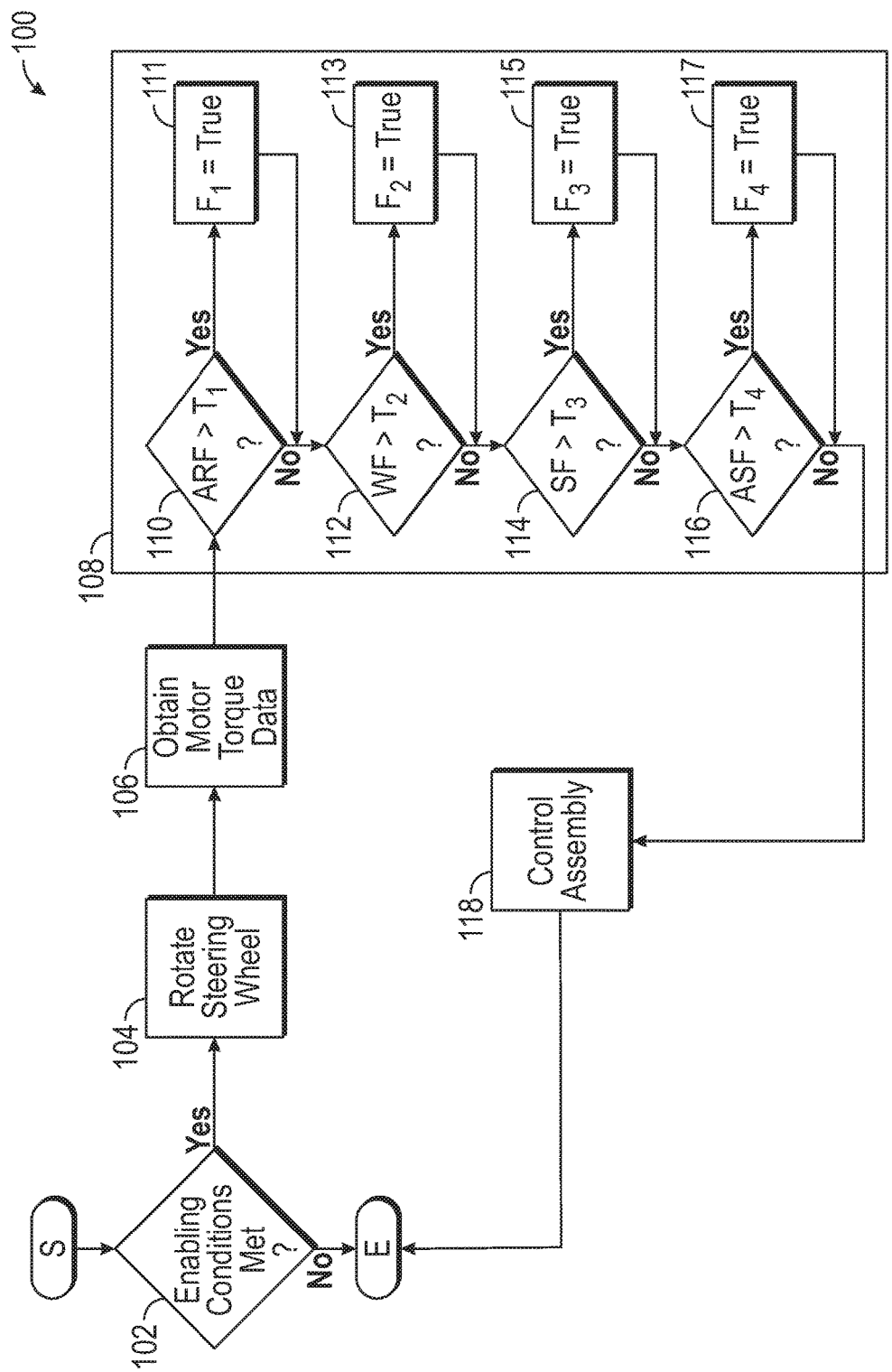
FIG. 2 is a schematic flow diagram for a method executable by the controller of FIG. 1.

Referring to FIG. 1, the controller C includes at least one processor P and at least one memory M (or non-transitory, tangible computer readable storage medium) on which are recorded instructions for executing method 100, shown in FIG. 2, for controlling operation of the assembly 10. The memory M can store controller-executable instruction sets, and the processor P can execute the controller-executable instruction sets stored in the memory M.

The controller C of FIG. 1 is specifically programmed to execute the steps of the method 100 and can receive inputs from various sensors, including but not limited to, a steering unit position sensor 16, a steering unit torque sensor 18, a motor position sensor 20, a motor torque sensor 22 and a motor current sensor 24. Look-up tables may also be employed. The sensors may be based on resolvers, optical encoders, Hall Effect devices or various other technologies available to those skilled in the art.

The method 100 allows the assembly to monitor its performance and compare it with predetermined data that quantifies optimal performance. This is a distinct technical advantage for autonomous vehicles without a human driver. The method 100 enables the detection of loose mechanical components, lash and other issues in the assembly 10.

Referring now to FIG. 2, a flowchart of the method 100 stored on and executable by the controller C of FIG. 1 is shown. Method 100 need not be applied in the specific order recited herein. Furthermore, it is to be understood that some steps may be eliminated. The start and end of the method 100 are indicated in FIG. 1 by "S" and "E", respectively.

The method 100 may begin with block 102, where the controller C is configured to or programmed to determine if one or more enabling conditions are met. Examples of enabling conditions include that the ignition of the device 11 is cycled on and that the speed of the device 11 is zero. Another enabling condition may be that there are no hands on the steering unit 12. Another enabling condition may be that the method 100 is carried out after a certain mileage is reached or after the device 11 is serviced. Another enabling condition may be that the method 100 is executed once per 24 hours, so if the method 100 has already been executed in the last 24 hours, the enabling condition is not met. The method 100 may employ sensors or methods available to those skilled in the art to determine if the enabling conditions are met.

If each of the one or more enabling conditions are met, the method 100 proceeds to block 104. Referring to FIG. 1, in block 104, the controller C is configured to cause the steering unit 12 to rotate from an original position B through a plurality of angles ($\theta$), via a command to the motor 14. The steering unit 12 is caused to rotate first in a forward direction (shown by first path $A_1$) up to a predefined maximum angle ($\theta_m$), second in a reverse direction (shown by second path $A_2$) up to a negative of the predefined maximum angle ($-\theta_m$), and third in the forward direction (shown by third path $A_3$) back to the original position B. The steering unit 12 may be configured to move to the commanded angle at a predefined rate. It is to be noted that the forward direction may be clockwise or counter-clockwise. The reverse direction is opposite to the forward direction. The steering unit 12 may be rotated through the first, second and third paths ($A_1$, $A_2$, $A_3$) repeatedly for a predefined time period. As noted above, one of the enabling conditions may be that there are no hands on the steering unit 12. This may be monitored by a hands on/off sensor or detection algorithm.

The predefined maximum angle ($\theta_m$) may be selected to cover the entire range of travel of the steering unit 12. In one embodiment, the predefined maximum angle ($\theta_m$) is above 360 degrees. For example, the predefined maximum angle ($\theta_m$) may be about 540 degrees. In another embodiment, the predefined maximum angle ($\theta_m$) is selected to be relatively small, for example, within about 2 degrees.

In block 106 of FIG. 2, the controller C is configured to obtain motor torque data characterizing a motor torque of the motor 14 at the plurality of angles ($\theta$). The motor torque data may be obtained based on the position of the steering unit 12, position of the motor 14 and at least one of the motor torque and the motor current. The controller C may receive a steering unit position from the steering unit position sensor 16. The motor torque and motor current may be received from the motor torque sensor 22 and motor current sensor 24, respectively. Other estimation or modeling methods to obtain the position of the steering unit 12 and the motor torque may be employed.

Figure 3:
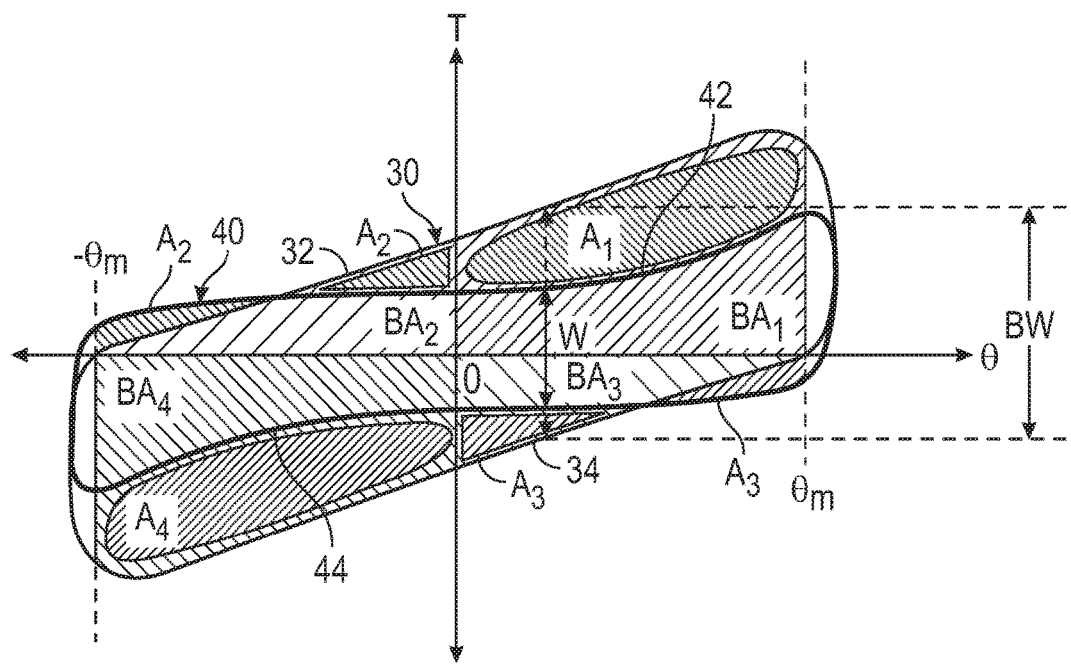
FIG. 3 is a schematic illustration of an example cycle diagram and an example baseline diagram employable in the method of FIG. 2, depicting an area factor and a width factor.
Figure 4:
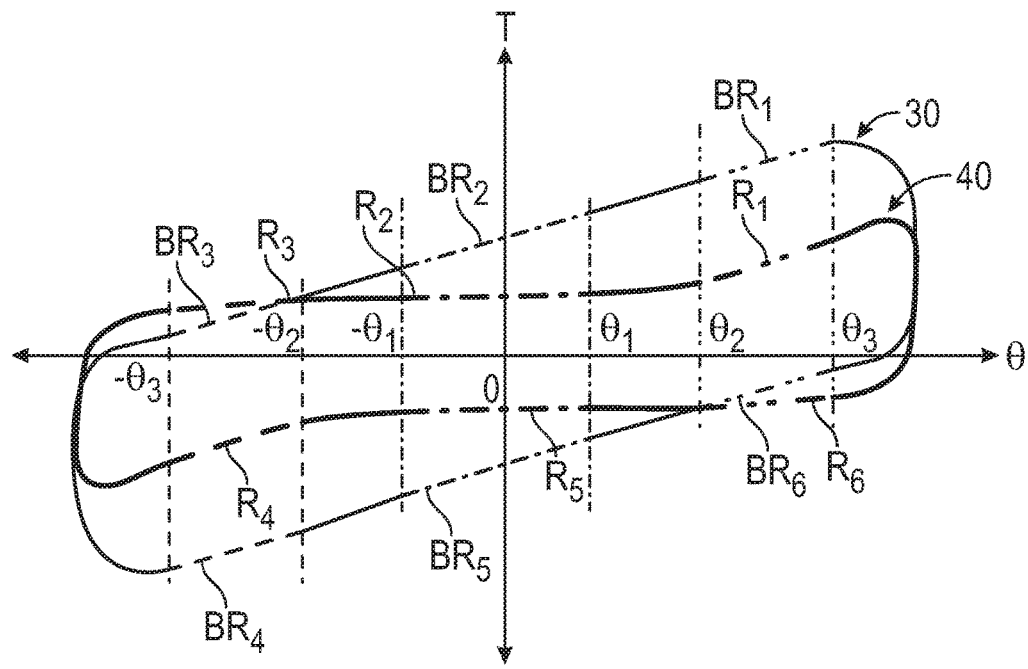
FIG. 4 is the cycle diagram and the baseline diagram of FIG. 3, depicting a slope factor.
Figure 5:
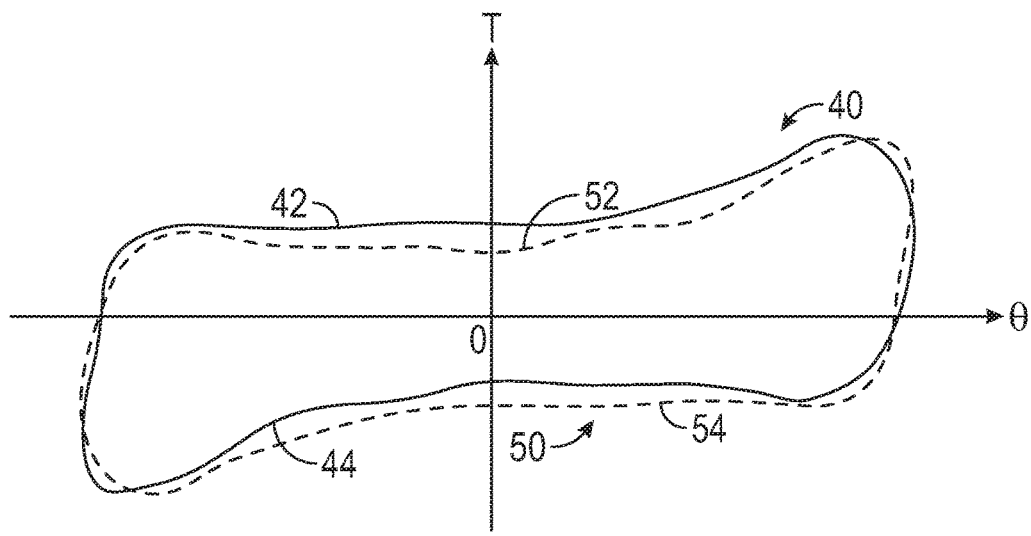
FIG. 5 is a schematic illustration of another cycle diagram and a flipped cycle diagram, depicting an asymmetry factor.

In block 108 of FIG. 2, the controller C is configured to compare the motor torque data with predetermined baseline data. The predetermined baseline data characterizes expected or optimal torque of the motor 14 at the plurality of angles ($\theta$). The predetermined baseline data may be generated under ideal conditions in a test cell, laboratory or otherwise with the device 11. The motor torque data and the predetermined baseline data may be stored or represented in a number of formats or data repositories. In one embodiment, the motor torque data and the predetermined baseline data are stored in look-up tables. In another embodiment, the motor torque data is displayed as a graphical diagram, referred to herein as cycle diagram 40, and the baseline data is displayed as the baseline diagram 30. Referring to FIGS. 3-4, an example of a baseline diagram 30 is shown. Referring to FIGS. 3-5, an example of a cycle diagram 40 is shown. The cycle diagram 40 (see FIG. 3) has an upper portion 42 and a lower portion 44. The baseline diagram 30 (see FIG. 3) has an upper portion 32 and a lower portion 34.

Block 108 of FIG. 2 includes sub-blocks 110 through to 117 (inclusive). In block 110 of FIG. 2, the controller C is configured to determine if an area factor (ARF) of the cycle diagram 40 exceeds a first predefined threshold ($T_1$). The first through fourth predefined thresholds ($T_1$, $T_2$, $T_3$, $T_4$) (described below) may be physical values or percentage deviations from a fixed value. In block 111, a first of a plurality of flags ($F_1$) is set as true if the area factor (ARF) exceeds the first predefined threshold ($T_1$). The area factor (ARF) may be based at least partially on a first ratio $[A_1/BA_1]$ and a second ratio $[A_4/BA_4]$. As shown in FIG. 3, $A_1$ and $A_4$ are areas between the baseline diagram 30 and the cycle diagram 40, in a first quadrant (upper right) and a fourth quadrant (lower left), respectively. As shown in FIG. 3, $BA_1$ and $BA_4$ are areas between the baseline diagram 30, a vertical axis (T) and a horizontal axis ($\theta$), in a first quadrant (upper right) and a fourth quadrant (lower left), respectively. In one embodiment, the area factor (AF) is defined as a sum of the first and second ratios such that: $ARF=[A_1/BA_1+A_4/BA_4]$. In another embodiment, the area factor (AF) is defined as: $ARF=[A_1+A_4]/[BA_1+BA_4]$. The area factor (AF) may also be extended to all the four quadrants, with the area factor being defined as:

$$ARF=[A_1+A_2+A_3+A_4]/[BA_1+BA_2+BA_3+BA_4].$$

Here $A_2$ and $A_3$ are areas between the baseline diagram 30 and the cycle diagram 40 in a second quadrant (upper left) and a third quadrant (lower right), respectively. Additionally, $BA_2$ and $BA_3$ are areas between the baseline diagram 30, a vertical axis (T) and a horizontal axis ($\theta$), in a second quadrant (upper left) and a third quadrant (lower right), respectively. It is to be appreciated that the areas may include multiple discontinuous portions, for example, areas $A_2$ and $A_3$ in FIG. 3 include two portions each.

In block 112 of FIG. 2, the controller C is configured to determine if a width factor (WF) of the cycle diagram 40 exceeds a second predefined threshold ($T_2$). In block 113, a second of a plurality of flags ($F_2$) is set as true if the width factor (WF) exceeds the second predefined threshold ($T_2$). Referring to FIG. 3, the width factor (WF) may be based at least partially on a difference between a baseline width (BW) of the baseline diagram 30 at an angle ($\theta$) and a width (W) of the cycle diagram 40 at the angle ($\theta$). In one embodiment, the width factor (WF) is defined as a sum of the differences |BW($\theta$)−W($\theta$)| over a range of selected angles ($\theta_1, \theta_2, \ldots \theta_n$) between the predefined maximum angle and the negative of the maximum angle ($-\theta_m, +\theta_m$) such that:

$$WF = \Sigma_{i=1}^{n} W_i |BW(\theta i) - W(\theta i)|.$$

Optionally, a weighting factor ($W_i$) may be employed.

In block 114 of FIG. 2, the controller C is configured to determine if a slope factor (SF) of the cycle diagram 40 exceeds a third predefined threshold ($T_3$). In block 115, a third of a plurality of flags ($F_3$) is set as true if the slope factor (SF) exceeds the third predefined threshold ($T_3$). The slope factor (SF) may be based at least partially on a difference between respective slopes (S) of a first portion ($R_i$, such as $R_1, R_2, R_3, R_4, R_5, R_6$ shown in FIG. 4) of the cycle diagram 40 and a corresponding second portion ($BR_i$, such as $BR_1, BR_2, BR_3, BR_4, BR_5, BR_6$ shown in FIG. 4) of the baseline diagram 30, where the first portion ($R_i$) and the corresponding second portion ($BR_i$) extend over an identical range of angles. For the example shown in FIG. 4, ($R_1, BR_1$) and ($R_6, BR_6$) extend over the range of angles ($\theta_2, \theta_3$), while ($R_2, BR_2$) and ($R_5, BR_5$) extend over the range of angles ($-\theta_1, \theta_1$). Additionally, ($R_3, BR_3$) and ($R_4, BR_4$) extend over the range ($-\theta_3, -\theta_2$). In one embodiment, the slope factor (SF) is defined as a sum of the differences |S($R_i$)−S($BR_i$)| over a number of portions (i) such that:

$$SF = \Sigma_{i=1}^{n} W_i |S(R_i) - S(BR_i)|$$

The number of portions (i=1 . . . n) may be selected based on the application at hand. Optionally, a weighting factor ($W_i$) may be employed.

In block 116 of FIG. 2, the controller C is configured to determine if an asymmetry factor (ASF) of the cycle diagram 40 exceeds a fourth predefined threshold ($T_4$). In block 117, a fourth of a plurality of flags ($F_4$) is set as true if the asymmetry factor (ASF) exceeds the fourth predefined threshold ($T_4$). The asymmetry factor (ASF) may be based at least partially on a difference between a torque (T) of the cycle diagram 40 at an angle ($\theta$) and a torque ($T_F$) of a flipped cycle diagram 50 (see FIG. 5) at the angle ($\theta$). Referring to FIG. 5, the flipped cycle diagram 50 has an upper portion 52 and a lower portion 54. Referring to FIG. 5, the flipped cycle diagram 50 represents the cycle diagram 40 after a rotation of 180 degrees about the origin or mirrored about one or both of the vertical axis and the horizontal axis. In one embodiment, the asymmetry factor (ASF) is set as the area factor (ARF) of the original cycle diagram 40 (which is considered as baseline) and the flipped cycle diagram 50. The asymmetry factor (ASF) is defined as:

$$ASF = \frac{\int_{-\theta m}^{+\theta m} |T_{upper}(\theta) - T_{F,upper}(\theta)| + |T_{lower}(\theta) - T_{F,lower}(\theta)| d\theta}{\int_{-\theta m}^{+\theta m} |T_{upper}(\theta) - T_{lower}(\theta)| d\theta}$$

In block 118 of FIG. 2, the controller C is configured to control the assembly 10 based at least partially on the comparison of the motor torque data and the baseline data (see block 108). This may be done, for example, by comparing cycle diagram 40 and the baseline diagram 30. In one embodiment, if at least one of the plurality of flags is true, then the controller C may be configured to generate a diagnostic report indicating the various factors described above. The diagnostic report may be wirelessly sent to a remote device (such as remote server 60 in FIG. 1), through a WIFI or other connection. Other methods may be employed, including but not limited to, a wired service tool that is plugged in. In one example, the device 11 is an autonomous vehicle and the remote server 60 is configured to manage its operation. If at least two of the plurality of flags are true, then the controller C may be configured to send a message to the remote server 60 that a manual inspection of the device 11 is recommended. The controller C may also be configured to initiate an alternative mode of operation for the device 11, such as a "limp home mode."

The first through fourth predefined thresholds ($T_1, T_2, T_3, T_4$) may be physical values or percentage deviations from a fixed value and may be selected based on the application at hand. By way of non-limiting examples, the first threshold $T_1$ may be set as about 10%. The second threshold $T_2$ may be set as about 0.5 Nm. The third threshold $T_3$ may be set as about 0.5 Nm/degrees. The fourth threshold $T_4$ may be set as about 10%. The controller C (and execution of the method 100) improves the functioning of the device 11 by determining a course of action for the assembly 10. The controller C of FIG. 1 may be an integral portion of, or a separate module operatively connected to, other controllers of the device 11.

The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A power steering assembly comprising:
   a steering unit configured to steer a device and a motor operatively connected to the steering unit;
   a controller in communication with the motor and including a processor and tangible, non-transitory memory on which is recorded instructions for executing a method;
   wherein the steering unit is configured to be rotatable by the motor based on a command by the controller to the motor;
   wherein execution of the instructions by the processor causes the controller to:
      determine if one or more enabling conditions are met, the one or more enabling conditions including an ignition of the device being on and a speed of the device being zero;
      if each of the one or more enabling conditions are met, then cause the steering unit to rotate through a plurality of angles from an original position, via the command to the motor such that the steering unit is rotated by the motor only, the steering unit being caused to rotate first in a forward direction up to a predefined maximum angle, second in a reverse direction up to a negative of the predefined maximum angle and third in the forward direction back to the original position;
      obtain motor torque data characterizing respective motor torque of the motor at the plurality of angles;
      compare the motor torque data to predetermined baseline data; and
      control the assembly based at least partially on the motor torque data and the predetermined baseline data.

2. The assembly of claim 1, wherein the predefined maximum angle is above 360 degrees.

3. The assembly of claim 1, wherein the predefined maximum angle is less than 10 degrees.

4. The assembly of claim 1, wherein:
   the controller is configured to compare the motor torque data to the predetermined baseline data, including determining if an area factor exceeds a first predefined threshold;
   the area factor is based at least partially on respective areas $[A_1, A_2, A_3, A_4]$ and $[BA_1, BA_2, BA_3, BA_4]$;
   the respective areas $[A_1, A_2, A_3, A_4]$ are between the predetermined baseline data and the motor torque data, in a first, second, third and fourth quadrant, respectively; and
   the respective areas $[BA_1, BA_2, BA_3, BA_4]$ are between the predetermined baseline data, a vertical axis and a horizontal axis, in a first, second, third and fourth quadrant, respectively.

5. The assembly of claim 4, wherein:
   the controller is configured to set a first of a plurality of flags as true if the area factor exceeds the first predefined threshold.

6. The assembly of claim 1, wherein:
   the controller is configured to compare the motor torque data to the predetermined baseline data, including determining if a width factor exceeds a second predefined threshold; and
   the width factor (WF) is based at least partially on a difference between a baseline width (BW) of the predetermined baseline data at an angle ($\theta$) and a width (W) of the motor torque data at the angle ($\theta$).

7. The assembly of claim 6, wherein:
   the controller is configured to set a second of the plurality of flags as true if the width factor exceeds the second predefined threshold.

8. The assembly of claim 1, wherein:
   the controller is configured to compare the motor torque data to the predetermined baseline data, including determining if a slope factor exceeds a third predefined threshold;
   the slope factor (SF) is based at least partially on a difference between respective slopes (S) of a first portion ($R_i$) of the motor torque data and a corresponding second portion ($BR_i$) of the predetermined baseline data; and
   the first portion ($R_i$) and the corresponding second portion ($BR_i$) extend over an identical range of angles.

9. The assembly of claim 8, wherein:
   the controller is configured to set a third of a plurality of flags as true if the slope factor exceeds the third predefined threshold.

10. The assembly of claim 1, wherein:
    the controller is configured to compare the motor torque data to the predetermined baseline data, including determining if an asymmetry factor exceeds a fourth predefined threshold;
    the asymmetry factor (ASF) is based at least partially on a difference between a torque (T) of the motor torque data at an angle ($\theta$) and a torque ($T_F$) of a flipped motor torque data at the angle ($\theta$); and
    the flipped motor torque data represents the motor torque data after a rotation of 180 degrees about the origin or mirrored about at least one of a vertical axis and a horizontal axis.

11. The assembly of claim 10, wherein:
    the controller is configured to set a fourth of the plurality of flags as true if the asymmetry factor exceeds the fourth predefined threshold.

12. The assembly of claim 1, wherein controlling operation of the assembly includes:
    if at least one of a plurality of flags is true, then generating a diagnostic report, via the controller.

13. A method for controlling operation of a power steering assembly, the assembly having a steering unit, a motor and a controller having a processor and tangible, non-transitory memory, the steering unit being configured to steer a device, the method comprising:
    determining if one or more enabling conditions are met, via the controller, the one or more enabling conditions including an ignition of the device being on and a speed of the device being zero;

wherein the steering unit is configured to be rotatable by the motor based on a command by the controller to the motor;

if each of the one or more enabling conditions are met, then causing the steering unit to rotate through a plurality of angles from an original position, via the command to the motor such that the steering unit is rotated by the motor only, the steering unit being caused to rotate first in a forward direction up to a predefined maximum angle, second in a reverse direction up to a negative of the predefined maximum angle and third in the forward direction back to the original position;

obtaining a motor torque data characterizing respective motor torque of the motor at the plurality of angles, via the controller;

comparing the motor torque data to predetermined baseline data; and controlling the assembly based at least partially on the motor torque data and the predetermined baseline data.

14. The method of claim 13, further comprising:
comparing the motor torque data to the predetermined baseline data, including determining if an area factor exceeds a first predefined threshold;
wherein the area factor is based at least partially on respective areas $[A_1,A_2,A_3,A_4]$ and $[BA_1,BA_2,BA_3,BA_4]$;
wherein the respective areas $[A_1,A_2,A_3,A_4]$ are between the predetermined baseline data and the motor torque data, in a first, second, third and fourth quadrant, respectively; and
wherein the respective areas $[BA_1,BA_2,BA_3,BA_4]$ are between the predetermined baseline data, a vertical axis and a horizontal axis, in a first, second, third and fourth quadrant, respectively.

15. The method of claim 13, further comprising:
comparing the motor torque data to the predetermined baseline data, including determining if a width factor exceeds a second predefined threshold;
wherein the width factor (WF) is based at least partially on a difference between a baseline width (BW) of the predetermined baseline data at an angle (θ) and a width (W) of the motor torque data at the angle (θ).

16. The method of claim 13, further comprising:
comparing the motor torque data to the predetermined baseline data, including determining if a slope factor exceeds a third predefined threshold;
wherein the slope factor (SF) is based at least partially on a difference between respective slopes (S) of a first portion ($R_i$) of the motor torque data and a corresponding second portion ($BR_i$) of the predetermined baseline data; and
wherein the first portion ($R_i$) and the corresponding second portion ($BR_i$) extend over an identical horizontal range.

17. The method of claim 13, further comprising:
comparing the motor torque data to the predetermined baseline data, including determining and determining if an asymmetry factor exceeds a fourth predefined threshold;
wherein the asymmetry factor (ASF) is based at least partially on a difference between a torque (T) of the motor torque data at an angle (θ) and a torque ($T_F$) of a flipped motor torque data at the angle (θ); and
wherein the flipped motor torque data represents the motor torque data after a rotation of 180 degrees about the origin or mirrored about at least one of a vertical axis and a horizontal axis.

18. The method of claim 13, wherein controlling operation of the assembly includes:
if at least one of a plurality of flags is true, then generating a diagnostic report, via the controller.

19. A power steering assembly comprising:
a steering unit configured to steer a device and a motor operatively connected to the steering unit;
a controller in communication with the motor and including a processor and tangible, non-transitory memory on which is recorded instructions for executing a method;
wherein the steering unit is configured to be rotatable by the motor based on a command by the controller to the motor;
wherein execution of the instructions by the processor causes the controller to:
determine if one or more enabling conditions are met, the one or more enabling conditions including an ignition of the device being on, a speed of the device being zero and execution of the method at predefined intervals;
if each of the one or more enabling conditions are met, then cause the steering unit to rotate through a plurality of angles from an original position, via the command to the motor such that the steering unit is rotated by the motor only, the steering unit being caused to rotate first in a forward direction up to a predefined maximum angle, second in a reverse direction up to a negative of the predefined maximum angle and third in the forward direction back to the original position;
generate motor torque data characterizing torque of the motor at the plurality of angles;
compare the motor torque data to predetermined baseline data, including determining if at least one of a plurality of factors exceeds a respective predefined threshold; and
control the assembly based at least partially on the motor torque data and the predetermined baseline data, including generating a diagnostic report when the at least one of the plurality of factors exceeds the respective predefined threshold.

20. The assembly of claim 1, wherein:
the one or more enabling conditions include no hands on the steering unit.

* * * * *